(12) United States Patent
Murakami et al.

(10) Patent No.: US 7,680,320 B2
(45) Date of Patent: Mar. 16, 2010

(54) IMAGE PROCESSING METHOD, SUBSTRATE INSPECTION METHOD, SUBSTRATE INSPECTION APPARATUS AND METHOD OF GENERATING SUBSTRATE INSPECTION DATA

(75) Inventors: Kiyoshi Murakami, Kyoto (JP); Masato Ishiba, Kyoto (JP); Teruhisa Yotsuya, Kyoto (JP)

(73) Assignee: OMRON Corporation, Kyoto (JP)

( * ) Notice: Subject to any disclaimer, the term of this patent is extended or adjusted under 35 U.S.C. 154(b) by 1094 days.

(21) Appl. No.: 11/317,415

(22) Filed: Dec. 22, 2005

(65) Prior Publication Data

US 2006/0140471 A1    Jun. 29, 2006

(30) Foreign Application Priority Data

Dec. 27, 2004  (JP)  .............................. 2004-377931
Dec. 15, 2005  (JP)  .............................. 2005-361711

(51) Int. Cl.
*G06K 9/00*    (2006.01)

(52) U.S. Cl. ..................................... 382/145
(58) Field of Classification Search ................. 382/141, 382/145, 162, 190
See application file for complete search history.

(56) References Cited

U.S. PATENT DOCUMENTS 5,039,868 A * 8/1991 Kobayashi et al. ..... 250/559.08
5,892,241 A * 4/1999 Moriya ..................... 250/559.4

FOREIGN PATENT DOCUMENTS

| JP | 07-063686 | 3/1995 |
| JP | 07-063686 | 10/1995 |
| JP | 08-110216 | 4/1996 |
| JP | 08-131964 | 5/1996 |
| JP | 08-318619 | 12/1996 |
| JP | 2002-207994 | 7/2002 |
| JP | 2003-207461 | 7/2003 |
| JP | 2004-109018 | 8/2004 |

OTHER PUBLICATIONS

Japan patent application No. 2005-361711, Examination Report dated Jan. 16, 2007.
Japan patent application No. 2005-361711, Examination Report dated Sep. 26, 2006.
Japan patent application No. 2005-361711, Examination Report dated January 16, 2007.

* cited by examiner

*Primary Examiner*—Daniel G Mariam
(74) *Attorney, Agent, or Firm*—Weaver Austin Villeneuve & Sampson LLP

(57) ABSTRACT

A color image as a combination of color data corresponding to a plural n-number of different hues is processed by extracting a target object from the image and carrying out a specified image processing. A reference image is obtained in the absence of the target object. Color data corresponding to specified less than n of the different hues are considered and difference in the degree of intensity of the considered color data relative to the combination of color data corresponding to n different hues between each pixel of the target image containing the target object and a corresponding pixel on the reference image are extracted. Pixels for which the extracted difference is greater than a specified threshold value and is in a specified direction are extracted. An image area formed by the extracted pixels are recognized as the target object.

4 Claims, 10 Drawing Sheets

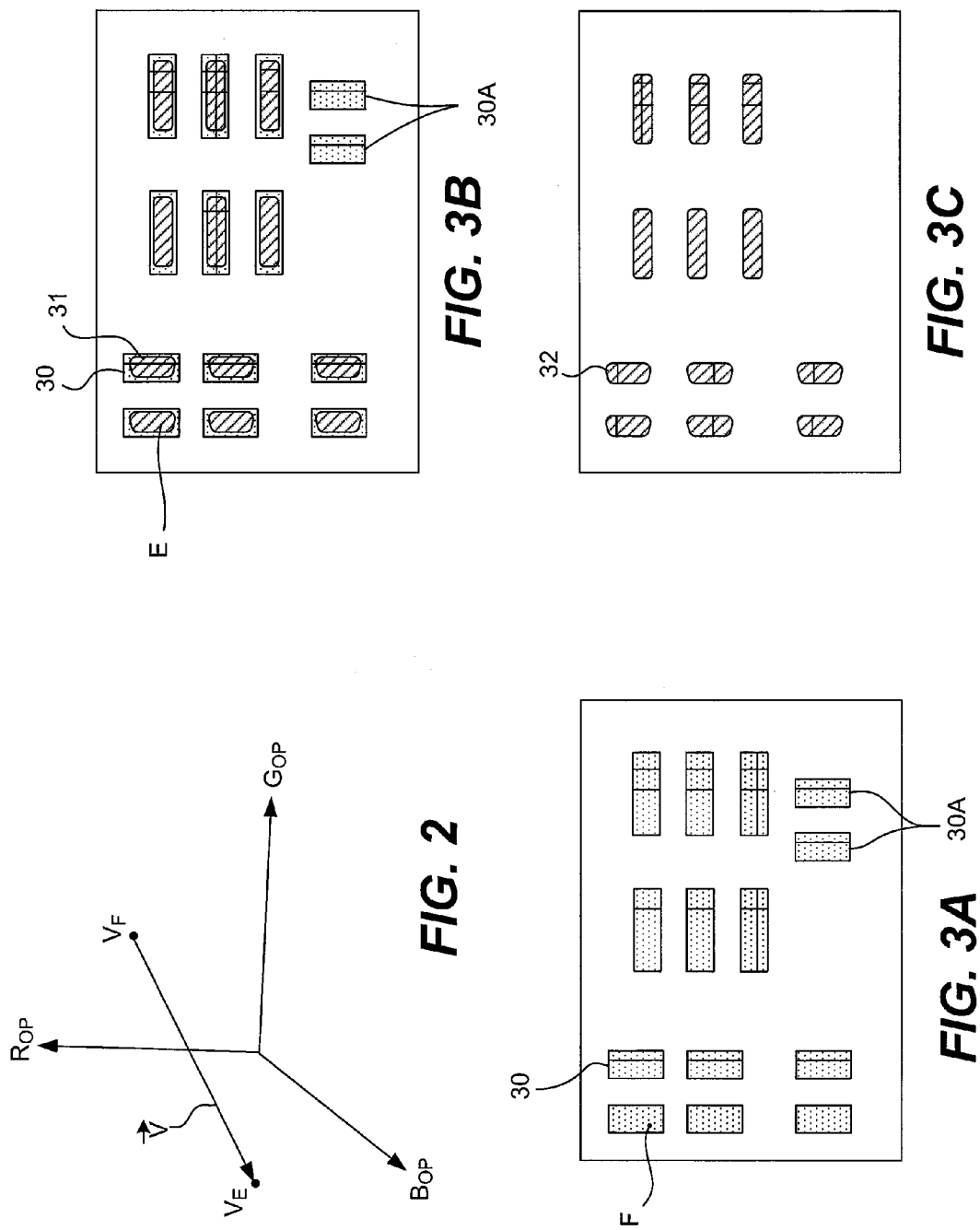

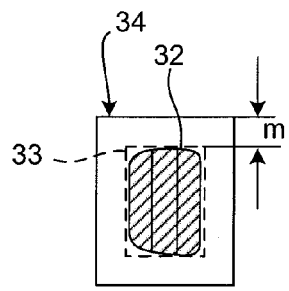
FIG. 5
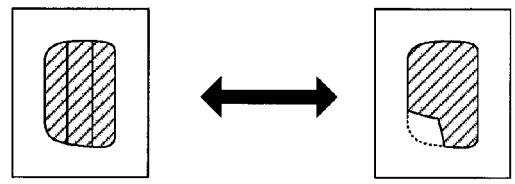
FIG. 6A    FIG. 6B
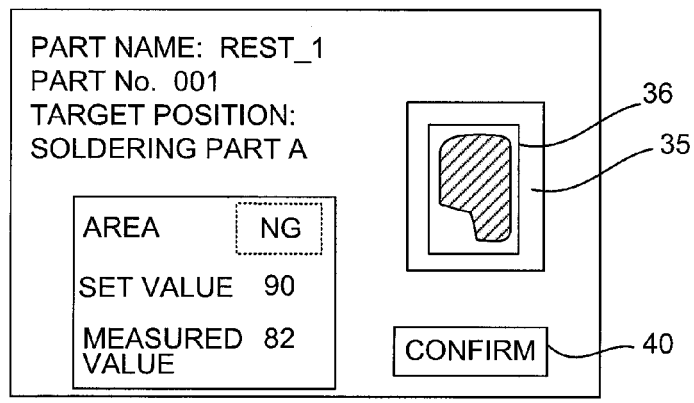
FIG. 8
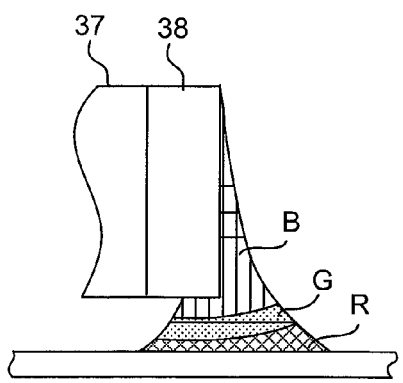
FIG. 9A    FIG. 9B

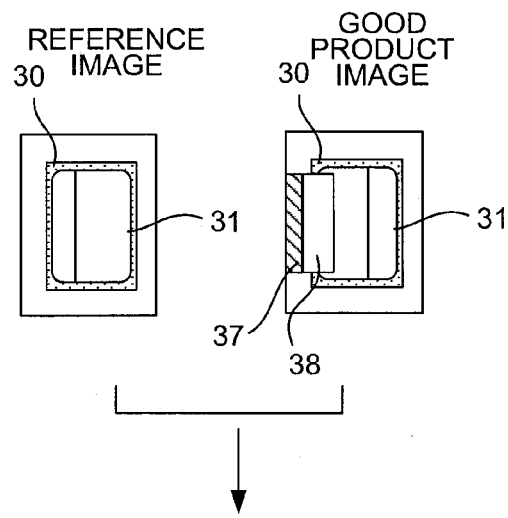
FIG. 14A
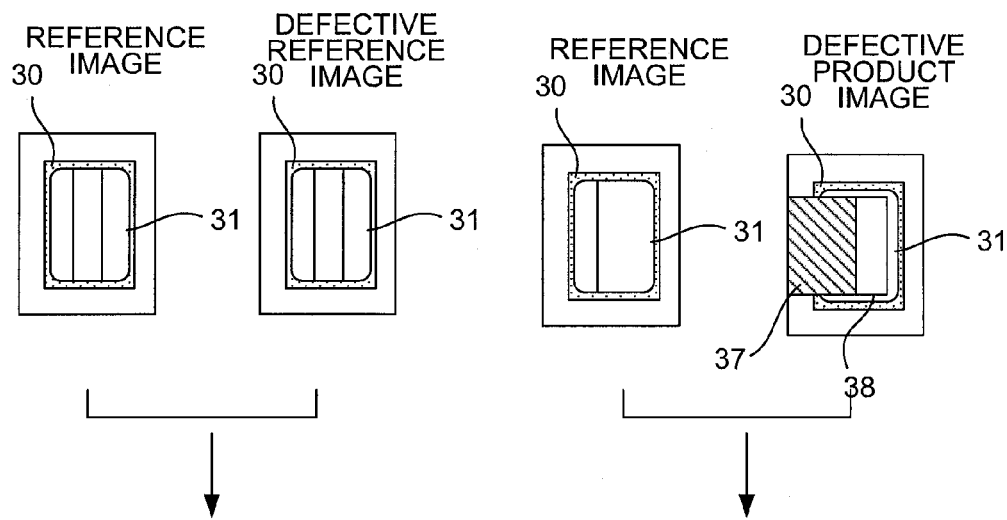
FIG. 14B  FIG. 14C

IMAGE PROCESSING METHOD, SUBSTRATE INSPECTION METHOD, SUBSTRATE INSPECTION APPARATUS AND METHOD OF GENERATING SUBSTRATE INSPECTION DATA

This application is based on and claims priority from Japanese Patent Applications 2004-377931 filed Dec. 27, 2004 and 2005-361711 filed Dec. 15, 2005.

BACKGROUND OF THE INVENTION

This invention relates to the technology of processing a color image and thereby carrying out a specified image processing on a target object of observation in that image. The invention also relates to the technology of processing a color image of a substrate and carrying out an automatic inspection on a target component part to be inspected contained in that image, as well as to the technology of generating inspection data that are necessary for carrying out such an automatic inspection.

The production process for component-mounting substrates generally include processes for applying a cream solder on a printed circuit board by printing, mounting a component onto an area where the cream solder has been applied and soldering the mounted component onto the substrate by heating it.

When component-mounting substrates are produced by a series of processes as described above, it is preferable to carry out an inspection after each of these processes in order to check whether that process has been performed properly or not. In view thereof, Japanese Patent Koho 3250335, for example, has described a substrate inspection apparatus adapted to automatically inspect a target component part by processing a color image.

Substrate inspection apparatus of this type are generally adapted to generate an image of a target substrate to be inspected (herein referred to as a target image) and to thereafter set an inspection area for each target component part on this target image, extracting in each inspection area pixels having the same color as the target component part by using binarization threshold values each determined for red (R), green (G) or blue (B). The image area formed by the extracted pixels is considered as the target component part, and the appropriateness of such a target component part is judged by comparing its area and position with preliminarily set reference values.

Substrate inspection apparatus of this type are also adapted to make use of an illumination mechanism referred to as the color highlight illumination for inspecting fillets on the substrate after the soldering process at the end. According to this illumination mechanism, beams of colored light in red, green and blue are projected onto the substrate with different angles of elevation, the elevation angle of the red light being the largest, the of the green light being smaller and that of the blue light being the smallest. The camera for taking the image of the substrate is set so as to have its optical axis oriented vertically, and the light sources are arranged so as to surround this optical axis. With the optical system thus formed, the camera receives beams of light with different colors according to the slope of the solder, and a fillet appears on the generated image as a pattern of colors R, G and B.

When a fillet is inspected, color patterns of R, G and B in an inspection area are individually extracted, and the appropriateness of position and size is judged for each color pattern. In this manner, the appropriateness of the sloped condition of a solder can be determined with a high degree of accuracy.

Prior art substrate inspection apparatus are adapted to extract a target component part by a binarization method. As the brightness of the surrounding environment changes, however, the brightness of the substrate surface may change and a shadow may be cast on the target component part. In the presence of such a change, the color condition of the target component part changes and it may become impossible to accurately extract a target component part merely by using a preliminarily set threshold value.

In the case of a general image processing (not necessarily for the inspection of a substrate), too, there are situations where the tint (or hue) of a target object to be observed varies because of changes in the illumination and individual differences among different target objects. Thus, a target object may not be accurately extracted if its color is determined to be within a particular range and only colors contained within this range are to be extracted.

SUMMARY OF THE INVENTION

It is therefore an object of this invention in view of the problem stated above to improve the accuracy of image processing of different kinds such as for inspection by accurately extracting a target object of observation even where its tint (or hue) may change to a certain extent.

Image processing methods of this invention have as the target object of processing a color image which is a combination of color data corresponding to a plural n-number ($n \geq 2$) of hues. A target object of observation is extracted from this target image and a specified image processing is carried out. The image processing may include measurements of the position, the size and the shape of the contour of the target object and the results of such measurements may be compared with specified threshold values to judge the appropriateness of the target object. Similarity between image data of the extracted target object and those of a preliminarily selected model may be obtained and outputted or the appropriateness of the target object may be determined from the degree of this similarity.

The image processing may include the simple process of displaying the result of extracting a target object of observation. An extracted target object may be displayed in a specified color in order to make it conspicuous in a target image to be processed.

In the above, the color image may be an image formed with gradation data in three colors of red, green and blue as color data but a color image of a combination of color data corresponding to four or more colors may be used as the target object of processing.

An image processing method of this invention may be characterized as carrying out the following three (first, second and third) steps. In the first step, a reference image is obtained in the absence of a target object in the field of vision of the image-taking means for obtaining this image. In the second step, those of the color data corresponding to specified less than n of the aforementioned different hues are considered and difference both in magnitude and in direction in the relationship of intensity of the considered color data with respect to the combination of color data corresponding to n different hues is extracted between each pixel of the target image containing the target object and a corresponding pixel on the reference image. In the third step, those of the pixels for which the difference extracted in the second step is greater than a specified threshold value and is in a specified direction are extracted, and an image area formed by the extracted pixels is recognized as the target object.

In the above, it is preferable that the target image to be processed and the reference image be of the same size and there be a one-to-one correspondence between their pixels. These images may be obtained by using a camera once or by obtaining a plurality of images and obtaining a final image by synthesizing them. It is also preferable that the reference image be obtained under the same illumination conditions and camera conditions as when the target image is obtained. Small variations in the illumination condition due to a change in the environmental condition, however, will not seriously affect the effect of the invention.

In the second step, it is preferable to consider the color data that tend to become significantly greater or smaller than the reference image due to the presence of the target object of observation. If the background portion where the target object is placed is green and the target object itself is red, for example, color data corresponding to red that will increase or that corresponding to green that will decrease may preferably be considered. Color data corresponding to both red and green may be considered.

The degree of intensity of the considered color data relative to the combination of color data corresponding to the n different hues is indicative of the effect of the color data under consideration with respect to the color determined by the color data corresponding to the n hues. The degree relative to the combination of color data may be the ratio with respect to the combination of color data. If the color data corresponding to red, green and blue are respectively r, g and b and if red is the color under consideration, the degree relative to the n different hues may be calculated as $r/(r+g+b)$.

When color data corresponding to a plurality of different hues are considered, such a ratio may be obtained for each hue or the sum of individual ratios may be considered. For example, when red and green are considered out of the total of red, green and blue, $r/(r+g+b)$ and $g/(r+g+b)$ may be obtained individually or $(r+g)/(r+g+b)$ may be obtained instead. The former method may be used when there is a change in both red and green by the presence of the target object of observation and the direction of change can be identified for each. The latter method may be used when the intensity of either red or green changes but it cannot be identified which of them actually changes.

The degree of intensity may be obtained as the ratio between considered and not considered colors. If blue is being considered but not red or green, $b/(r+g)$ may be calculated as the degree of intensity.

In the third step, if color data corresponding to only one hue are being considered, pixels may be extracted by checking changes in the positive or negative direction with respect to the threshold value. If color data corresponding to more than one different hues are considered, the sum of color vectors each corresponding to one of the hues being considered may be obtained and its length and direction may be compared with the threshold and the reference direction, respectively. Comparison may be made for each of the considered hues individually.

If the portion on the target image where the color has changed from the reference image is extracted merely by obtaining differences between color data of these images, not only differences in colors but also changes in brightness in similar hues are extracted. According to the present invention, changes in the degree (such as ratio) of intensity of color data relative to a combination of color data corresponding to a plural n-number of different hues are extracted and pixels are extracted according to whether this change is in a specified direction and exceeds a specified threshold value. Thus, areas with a change in hue due to the presence of the target object of observation can be accurately extracted. Since the characteristics in the intensity of color data are not affected by small variations in the tint or hue of the target object of observation due to a change in the brightness of the environment, the target object of observation can be more accurately extracted by the method of this invention than by the prior art method by binarization with reference to a specified combination of color data.

The invention secondly relates to a substrate inspection method characterized as obtaining a target image to be processed from a target substrate for inspection by a combination of color data corresponding to a plural n-number of hues and carrying out a specified inspection by extracting a target component part from the obtained target image. The target component part may be cream solder if the target substrate is after a solder printing process and a fillet obtained from molten solder if the target substrate is after the soldering process. It may be the main body of a mounted component if the target substrate is after the component-mounting process.

According to this substrate inspection method of this invention, a first step is carried out before the inspection and second, third and fourth steps are sequentially carried out thereafter on each target component part to be inspected. In the above, the first step is for obtaining a reference image from a substrate without a target component part thereon such as a substrate produced in an earlier step than any of the production steps for the target substrate. In the second step, a target area to be inspected is set at a position corresponding to one of the target component parts on the target image. In the third step, those of the color data corresponding to specified less than n different hues are considered, and difference both in magnitude and in direction in the degree of intensity of the considered color data relative to the combination of color data corresponding to the n different hues is extracted between each pixel of the target image containing the target object and a corresponding pixel on the reference image. In the fourth step, those of the pixels for which the difference extracted in the third step is greater than a specified threshold value and is in a specified direction are extracted, and image processing is carried out for the specified inspection on an image area comprised of the extracted pixels.

The data for setting the inspection area in the second step may be preliminarily obtained by the method of generating inspection data described below. In the third and fourth steps, processes described in the second and third steps of the image processing method described above may be carried out to extract target component parts. The degree of intensity of the considered color data relative to the combination of color data corresponding to the n different hues may be preliminarily obtained for each inspection area and registered for use in the process of the third step.

The invention thirdly relates to a substrate inspection apparatus characterized as comprising an image generating part for generating a color image of a target substrate for inspection as a combination of color data corresponding to a plural n-number of different hues, an image processor for extracting a target component part for inspection from the color image of the target substrate generated by the image generating part and carrying out an image processing for inspection, a judging part for judging whether the target substrate is good or defective based on results of the image processing by the image processor and an output part for outputting results of judging by the judging part.

In the above, the image generating part may include a camera for taking images of substrates and an A/D converter for the digital conversion of an image outputted from the camera. When a plurality of images are overlapped to form a target image for processing, a computer incorporating a program for image synthesis may also be included in the image generating part.

The image processor has many functions, some of which may be realized by computers incorporating programs and provided with internal and/or external memory.

The color data processing function of the image processor is for considering those of the color data corresponding to specified less than n different hues and calculating the degree of intensity of the considered color data relative to the combination of color data corresponding to n different hues for each pixel. Another function is for registering in a memory a reference image obtained by the image generating part from a substrate not provided with any target component part or results of the color data processing function on the reference image. Still another function is that of setting a target area to be inspected, when a target image of the target substrate for inspection is generated by the image generating part, at a position corresponding to a target component part in the target image. The image processor is further provided with functions for having an image in the target area processed by the color data processing function and using results of the process by the color data processing function and data stored by the memory to extract change in intensity of the considered color data for each of the inspection area from the corresponding pixels on the reference image, extracting those of the pixels at which the extracted change is greater than a specified threshold value and is in a specified direction and recognizing an image area formed by the extracted pixels as the target component part.

With a substrate inspection apparatus thus structured, as the first step of the aforementioned substrate inspection method is carried out, the reference image or the results of processing thereon are registered in the memory. At the time of an inspection, the second, third and fourth steps of the substrate inspection method are carried out.

The invention fourthly relates to a method of generating inspection data for an automatic inspection of a substrate by using a combination of color data corresponding to a plural n-number of different hues, characterized as comprising the following five steps. The first step is for obtaining a reference image from a substrate without target component part thereon and the second step is for obtaining a target image for inspection from a substrate having a target component part thereon. The third step is for considering those of the color data corresponding to specified less than n of the different hues and extracting difference both in magnitude and in direction in the degree of intensity of the considered color data relative to the combination of color data corresponding to n different hues between each pixel of the target image containing the target object and a corresponding pixel on the reference image. The fourth step is for extracting those of the pixels for which the difference extracted in the third step is greater than a specified threshold value and is in a specified direction and recognizing an image area formed by the extracted pixels as the target component part. The fifth step is for setting a target area for inspection including the target component part recognized in the fourth step and including the set target area in the inspection data for the target component part.

By this method, a reference image obtained from a substrate without a target component part and a target image obtained from a substrate with a target component part are used to extract target component parts by a process similar to the aforementioned image processing method. Thus, target component parts can be accurately extracted even the presence of differences in hue or tint due to brightness between the reference image and the target image for processing and inspection data for setting inspection areas can be correctly obtained. In summary, the capability of a substrate inspection apparatus can be significantly improved.

Throughout herein expressions "color," "hue" and "tint" are sometimes used interchangeably and not always strictly distinguished.

BRIEF DESCRIPTION OF DRAWINGS

FIG. 2 is a drawing for showing the concept of a color vector.

FIGS. 3A and 3B show a reference image and a model image, respectively, and

FIG. 3C shows areas extracted from these images.

FIG. 5 shows an example of inspection area being set.

FIG. 6A shows a model of a soldering area, and

FIG. 6B shows an inspection method using this model.

FIG. 8 is an example of display of judgment result on one inspection area.

FIGS. 9A and 9B, together referred to as FIG. 9, are examples of color distribution that may be obtained from a fillet on a chip component and a semi-spherical solder piece by a color highlight method.

FIGS. 14A, 14B and 14C, together referred to as FIG. 14, show methods of making models for the inspection of a component.

DETAILED DESCRIPTION OF THE INVENTION

Figure 1:
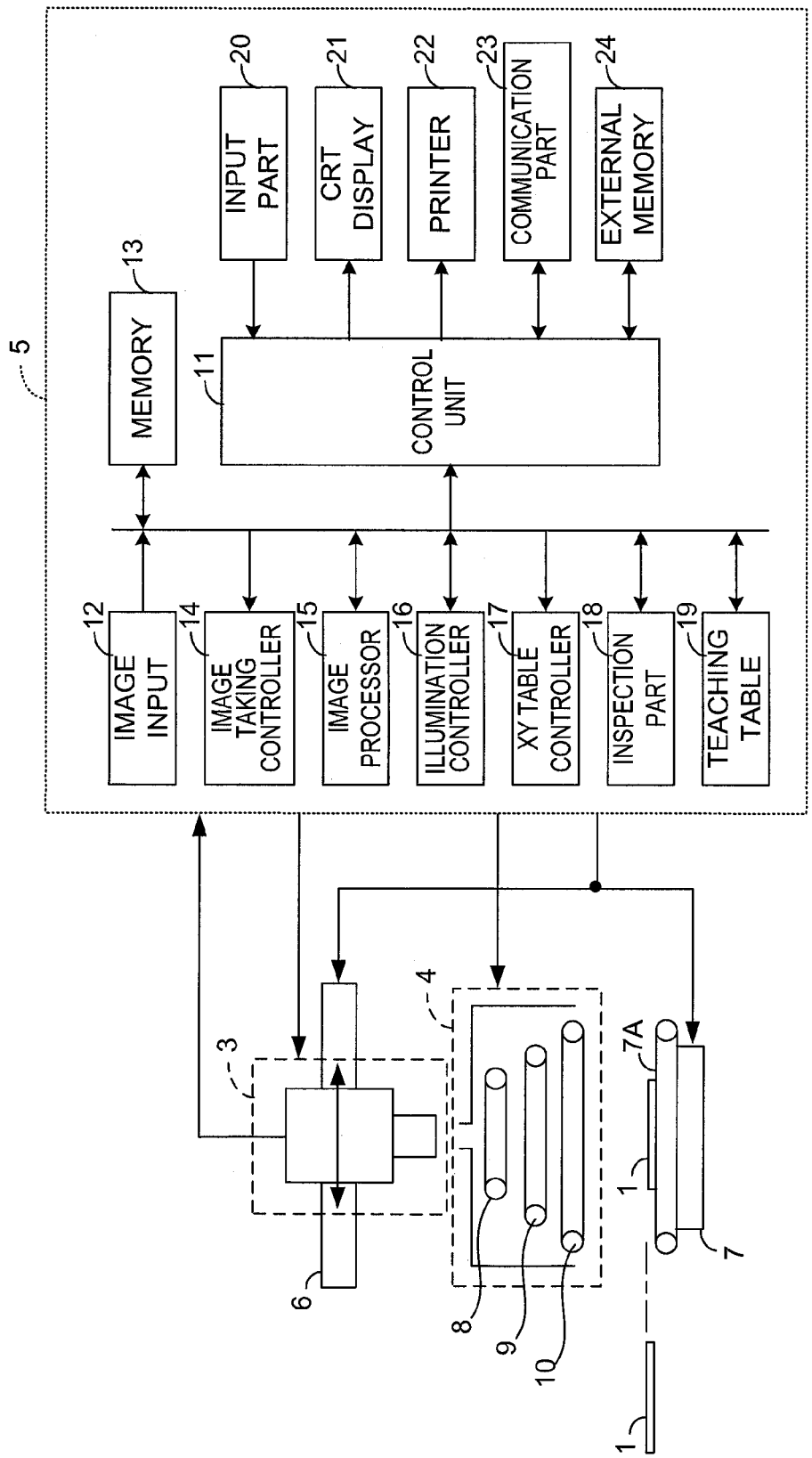
FIG. 1 is a block diagram of a substrate inspection apparatus embodying this invention.

FIG. 1 shows the structure of a substrate inspection apparatus embodying this invention, adapted to process an image obtained of a substrate 1 serving as the object of inspection and to thereby determine the appropriateness of a target component part on this substrate 1. The target component part can be appropriately set according to the kind of the substrate serving as the object of inspection. When a substrate after cream solder has been applied thereonto is to be inspected, a portion where the cream solder has been applied can be selected as a target component part. When a substrate after components have been amounted thereonto is to be inspected, the main body of a mounted component may be selected as a target component part. When a substrate after the soldering process is to be inspected, fillets of individual components may be selected as target component parts.

The substrate inspection apparatus of FIG. 1 is comprised of an image taking part 3, a light emitting part 4, a control processing part 5, an X-axis table part 6 and a Y-axis table part 7. The Y-axis table part 7 is provided with a conveyor 7A for supporting the substrate 1 and moving it in the direction of the Y-axis (perpendicular to the paper surface) by driving the conveyor 7A by means of a conveyor motor (not shown). The X-axis table part 6 is for supporting the image-taking part 3 and the light emitting part 4 above the Y-axis table part 7 and moving them in the direction of the X-axis (in the left-right direction).

The light emitting part 4 is structured for the aforementioned color highlight illumination, being comprised of three annular light sources 8, 9 and 10 with different diameters for emitting red light, green light and blue light, respectively. The light sources 8, 9 and 10 are positioned directly above the position of observation so as to be at different angles of elevation as seen from the target 1.

The image taking part 3 includes a CCD camera for generating a color image and is positioned such that its optical axis passed vertically through the centers of the light sources 8, 9 and 10. In this manner, reflected light from the substrate 1 serving as the object of observation is introduced into the image-taking part 3, converted into gradation data of R, G and B and inputted into the control processing part 5.

The control processing part 5 has a computer with a CPU as its control unit 11 and also includes an image input part 12, a memory 13, an image-taking controller 14, an image processor 15, an illumination controller 16, an XY table controller 17, an inspection part 18, a teaching table 19, an input part 20, a CRT display 21, a printer 22, a communication part 23 and an external memory 24.

The image input part 12 is provided with an amplifier circuit for amplifying the image signals R, G and B from the image taking part 3 and an A/D converter circuit for converting these image signals into digital signals. The memory 13 serves to store not only gradation data for each of R, G and B but also color data and calculated results of a color vector, to be explained below.

The image taking controller 14 is provided with an interface for connecting the image taking part 3 to the control unit 11 and serves to carry out various controls such as driving the image taking part 3 based on commands from the control unit 11 and adjusting the output level of each color light. The illumination controller 16 is for regulating the light quantity for each light source of the light emitting part 4. The light quantities for the light sources 8, 9 and 10 may be adjusted such that white light will be emitted for illumination.

The XY table controller 17 includes an interface for connecting the X-axis and Y-axis table parts 6 and 7 with the control unit 11 and serves to control the motions of these table parts 6 and 7 based on commands from the control unit 11.

The teaching table 19 is a memory part for storing inspection data for substrates and is provided inside a non-volatile memory such as a hard disk device. The inspection data include setting data of inspection areas for each target component part (including setting positions and area sizes), kinds of programs to be executed at each inspection area, models for target component parts and judgment reference values for judging appropriateness of target component parts.

These inspection data are "taught" prior to an inspection. They are arranged as an inspection data file for each kind of substrates and saved in the teaching table 19. After the name of the object substrate 1 to be inspected is inputted, the control unit 11 serves to read out from the teaching table 19 the inspection data file corresponding to this object substrate 1 and to set it in the memory 13. The image processor 15 and the inspection part 18 carry out their processing based on the inspection data in this file which has been read out.

At the time of an inspection, the image processor 15 carries out an image processing on the color image by the gradations R, G and B stored in the memory 13 and thereby measures the position and the size of each target component part. The inspection part 18 compares the results of the measurement with registered judgment reference values and thereby judges appropriateness of each target component part.

Whenever a judgment process is carried out by the inspection part 18, the control unit 11 outputs the result of this judgment to the CRT display part 21 (hereinafter simply referred to as the display part). After the inspection on each substrate is completed, the control unit 11 gathers together the judgment results on its target component parts and determines whether this substrate is a good product or not. This final judgment result is outputted to the display part 21 and the printer 22 or the communication part 23.

The input part 20 is for inputting various conditions for an inspection and inspection data and comprises a keyboard and a mouse. The display part 21 receives image data and inspection results from the control unit 11 and displays them on a display screen. The printer 22 serves to receive inspection results from the control unit 11 and to print them out in a predetermined format.

The communication part 23 is for exchanging data with other apparatus. When a substrate 1 is determined to be defective, its ID data and a description of its defects may be transmitted to a repairing apparatus on the downstream side such that the defective part can be quickly repaired. The external memory device 24 is for reading and writing data from and into a memory medium such as a flexible disk, a CD-R or a magneto-optical disk and is used for saving inspection results and taking in programs and setting data necessary for the inspection from outside.

In the above, the image processor 15 and the inspection part 18 may each comprise a dedicated processor having a program for the aforementioned processes installed but it is not always necessary to provide dedicated processors. The control unit 11 may be provided with the functions of the image processor 15 and the inspection part 18.

The substrate inspection apparatus as described above is used according to a method of this invention to generate images of the following two kinds, one of them being an image (referred to as a good product image) of an substrate (referred to as a good product substrate) having each target component part in a good condition, and the other being an image (referred to as a reference image) of a good product substrate before components are mounted thereto, and these images are used to automatically generate inspection data. This process for automatically generating inspection data is hereinafter referred to as the automatic teaching process.

The substrate to be used for obtaining a reference image may be a substrate on which the process preceding that of mounting these target component parts has just been completed or before it is introduced into this preceding process.

The good product image and the reference image are each obtained by dividing the corresponding substrate into a plurality of areas and synthesizing the images obtained from these areas. A preferable way of using this method for synthesizing an image is to set a plurality of image-taking areas by overlapping them by a width corresponding to the errors associated with the positioning of the X-axis and Y-axis table parts 6 and 7 and obtaining the synthesized image while overlapping the plurality of images in these overlapped areas. Prior to the entry into the automatic teaching process, it is preferable to improve the accuracy of corresponding relationship between the pixels by matching the coordinates of a characteristic pattern (such as a silk print pattern on the substrate) contained in common by both the good product image and the reference image.

In what follows, it is assumed that such processes for image synthesis and position matching have been carried out and the corresponding relationship between the good product image and the reference image has been established.

According to an example of automatic teaching process, hue data $R_{OP}$, $G_{OP}$ and $B_{OP}$ are obtained by substituting the gradation data r, g and b of each pixel of both the aforementioned model image and reference image into the following Formulas (1), (2) and (3):

$$R_{OP} = 100r/(r + g + b) \quad \text{Formula (1)}$$
$$G_{OP} = 100g/(r + g + b) \quad \text{Formula (2)}$$
$$B_{OP} = 100b/(r + g + b) \quad \text{Formula (3)}$$

Furthermore, the following Formulas (4), (5) and (6) are used for each pixel on the model image to extract differences $V_r$, $V_g$ and $V_b$ between the hue data and the corresponding pixel on the reference image:

$$V_r = R_{OP}(E) - R_{OP}(F) \quad \text{Formula (4)}$$
$$V_g = G_{OP}(E) - G_{OP}(F) \quad \text{Formula (5)}$$
$$V_b = B_{OP}(E) - B_{OP}(F) \quad \text{Formula (6)}$$

where $R_{OP}(E)$, $G_{OP}(E)$ and $B_{OP}(E)$ are hue data obtained for the good product image by using Formulas (1)-(3) and $R_{OP}(F)$, $G_{OP}(F)$ and $B_{OP}(F)$ are color data obtained for the reference image.

These difference values $V_r$, $V_g$ and $V_b$ of the hue data extracted for each combination of corresponding pixels are edited as three-dimensionally arranged data and saved in the memory 13 in correlation with the coordinates of the pixels. As will be explained below, however, not all three hue data need be used for the calculation of these difference values.

FIG. 2 shows a three-dimensional space (hereinafter referred to as the hue space) having the hue data $R_{OP}$, $G_{OP}$ and $B_{OP}$ as its three coordinate axes. In this hue space, the relationship between the hues of the good product image and the reference image can be represented as a vector V from $V_F$ which represents the hue at point F (with coordinates $R_{OP}(F)$, $G_{OP}(F)$ and $B_{OP}(F)$) on the reference image to $V_E$ which represents the hue at point E (with coordinates $R_{OP}(E)$, $G_{OP}(E)$ and $B_{OP}(E)$) on the good product image. Examples of points E and F are shown in and will be explained with reference to FIGS. 3A and 3B below. The vector V which represents the arrangement of the difference values $V_r$, $V_g$ and $V_b$ obtained by Formulas (4), (5) and (6) is hereinafter referred to as the color vector, and the variation values are also respectively referred to as its red component, green component and blue component. The direction and the length of the color vector V essentially represent the difference in hue between points E and F.

According to this example of automatic teaching process, a specified component in the color vector is selected according to the color of the target component part, and pixels where the variation value shown by this component is greater than a specified threshold value are extract. The image area formed by these extracted pixels is recognized as the target component part. Conditions for setting an inspection area and a model of a target component part are obtained and registered in the teaching table 19.

At the time of an inspection, after an image of the target substrate to be inspected (hereinafter referred to as the target image) is generated, inspection areas are sequentially set on this target image and processes of extracting target component parts, measuring and judging are carried out. Color vectors are calculated also for this target image as done in the automatic teaching process, and target component parts are extracted by using the same component as used in the automatic teaching.

Next, details of a method of generating inspection data and carrying out an inspection will be explained more in detail for a situation, as an example, of inspecting a substrate on which cream solder has already been applied (hereinafter referred to as solder-coated substrate). In this example, an image of a printed circuit board before cream solder is printed (referred to as a bare substrate) will be used as the reference image.

FIGS. 3A and 3B respectively show a reference image generated from a bare substrate and a good product image of a solder-coated substrate. The reference image shows not only lands 30 but also silk print patterns (not shown). On the good product image, most of the images of the lands 30 are replaced by an image of cream solder 31. Since lands are generally made of copper as main component and have a smooth surface with a high mirror-surface reflectivity, their images become reddish under color highlight illumination. Images of cream solder become bluish because cream solder is grey and has a high diffusion reflectivity.

Thus, as cream solder is placed on a portion of a land, it may be expected that the condition of that portion where the red hue data $R_{OP}$ are dominant changes into a different condition where the blue hue data $B_{OP}$ are dominant. In other words, on a color vector between point E on cream solder on the model image and corresponding point F, it may be expected that the red component $V_r$ shows a large value in the negative direction and that the blue component $V_b$ shows a large value in the positive direction.

According to the instant example, blue components $V_b$ having positive values are noted, and areas formed with pixels having a value of $V_b$ greater than a specified threshold value are extracted as an area coated with cream solder (hereinafter referred to as solder-coated area).

FIG. 3C shows an example where solder-coated areas 32 have been extracted from the reference image and the good product image of FIGS. 3A and 3B by carrying out calculation of color vectors and the extraction process based on the blue component $V_b$. Since areas actually printed with cream solder are extracted, it becomes possible to thereafter determine conditions for setting inspection areas and threshold values for judgments by using the results of the extraction process.

The tints (or hues) of lands and cream solder in an image are likely to change, depending on the brightness of the surrounding environment and the differences in materials. Although some small changes may take place, the characteristics that the red hue data $R_{OP}$ tend to become larger on a land and the blue hue data $B_{OP}$ tend to become larger on the image of cream solder do not change. Thus, it is safe to assume that the blue component $V_b$ of a color vector V obtained from their images becomes larger. In other words, although the tint or hue of solder areas may undergo a small change, solder-coated areas can be extracted accurately based on the blue components $V_b$ of color vectors, and this allows inspection areas and models to be accurately determined.

Although inspection areas were set by prior art methods by using land-setting data in the design data for the substrate, the recent tendency is to use bare substrates of the same design to produce different component-mounting substrates. Thus, there are situations where the method of setting an inspection area by the design data of a land is not practical for an actual substrate.

Symbol 30A in FIGS. 3A and 3B indicates an example of image of lands where no component is mounted. Since cream solder is not applied to such lands, there is no need to set any inspection area for solder printing. According to the example of the present invention described above, areas where solder has actually been applied are extracted at the time of teaching of setting conditions for inspection areas, as described above and an inspection area can be set only at such an extracted part. Thus, no unnecessary inspection areas are set at the positions of the lands 30A and the teaching process can be carried out more efficiently.

Figure 4:
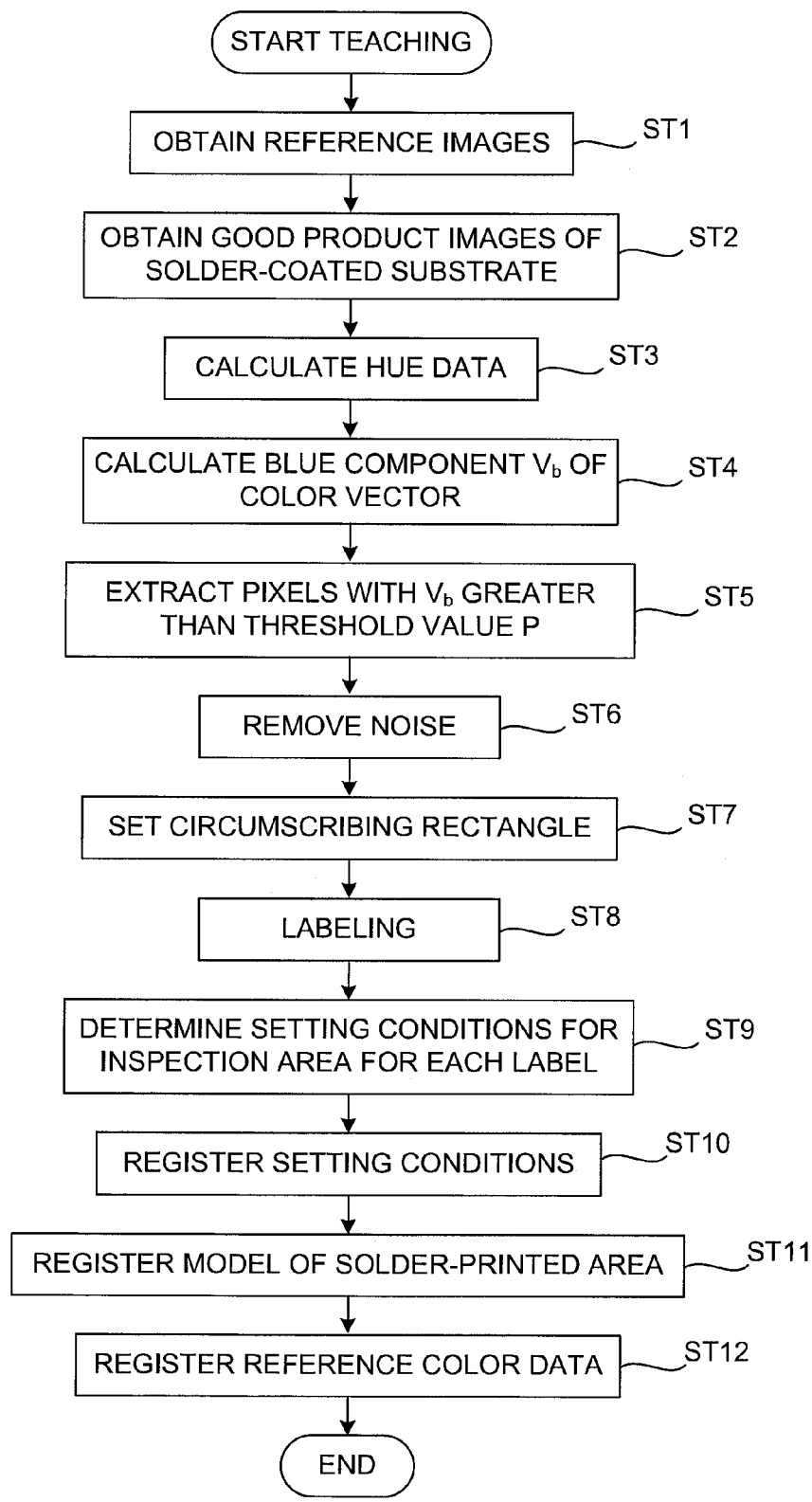
FIG. 4 is a flowchart of an automatic teaching process.

Next, the flowchart of FIG. 4 is referenced to explain the steps of an automatic teaching process.

To start, a bare substrate is transported to the Y-axis table part 7 and reference images are obtained by carrying out image taking and image synthesizing processes for a plural number of times (Step ST1). After the bare substrate is transported out, a good product substrate printed with cream solder is transported in and good product images are similarly obtained (Step ST2). In Step ST2, cream solder may be applied to the bare substrate used in Step ST1 to use it as the good product substrate.

After hue data are obtained by using Formulas (1), (2) and (3) on each constituent pixels of these images obtained in Steps ST1 and ST2 (Step ST3), each constituent pixel of a good product image is combined with the corresponding pixel of each of the reference images and a color vector is calculated for each of such combinations by using Formula (6) (Step ST4).

Next, pixels with the blue component $V_b$ exceeding threshold value P (P>0) are extracted as black pixels (Step ST5). The other pixels are extracted as white pixels such that a binary image is obtained. These extracted black pixels are sequentially examined, and those with an area smaller than a specified threshold value are eliminated as noise (Step ST6). The threshold value that is used for the elimination of noise is determined based on a standard size of soldering areas.

After these small areas are eliminated as noise, only areas larger than the specified threshold value remain. These areas are considered as solder-printing areas, and the process for generating inspection data is started next by setting a circumscribing rectangle to each of these solder-printing areas (Step ST7). Each of these combinations of a solder-printing area and its circumscribing rectangle are assigned an individual label (Step ST8), and setting conditions for inspection area are determined for each label (Step ST9).

FIG. 5 shows an example of method for setting an inspection area. Numeral 32 indicates a solder-printing area (black pixel area) extracted on the basis of the blue component as $V_b$ explained above, and numeral 33 indicates the circumscribing rectangle set in Step ST7. In this example, an inspection area 34 is set by extending each side of this circumscribing rectangle by a distance of m pixels. The integral number m is determined according, for example, to the density of mounted components.

After an inspection area 34 is set (Step ST9) for each soldering area as explained above with reference to FIG. 5 and its position and the size of the area are determined as setting conditions, these setting conditions are stored in the teaching table 19 (Step ST10). Next, an image in the inspection area 34 is cut out for each label from the binary image as the model of the solder-printing area 32 corresponding to that label and is registered in the teaching table 19 (Step ST11). Of the hue data calculated for each constituent pixel of the reference image, those corresponding to each of the inspection areas 34 are read out and registered in the teaching table 19 for each inspection area 34 (Step ST12). These registered hue data are hereinafter referred to as reference hue data. The setting conditions for inspection areas, models and reference hue data are all provided with the label of the corresponding inspection area 34.

FIG. 6A shows an example of model obtained in Step ST11. FIG. 6B shows the image in the inspection area corresponding to this model. This is a binary image (referred to as comparison image), like the model shown in FIG. 6A. In an inspection, a process for comparing the images of FIGS. 6A and 6B is carried out.

Figure 7:
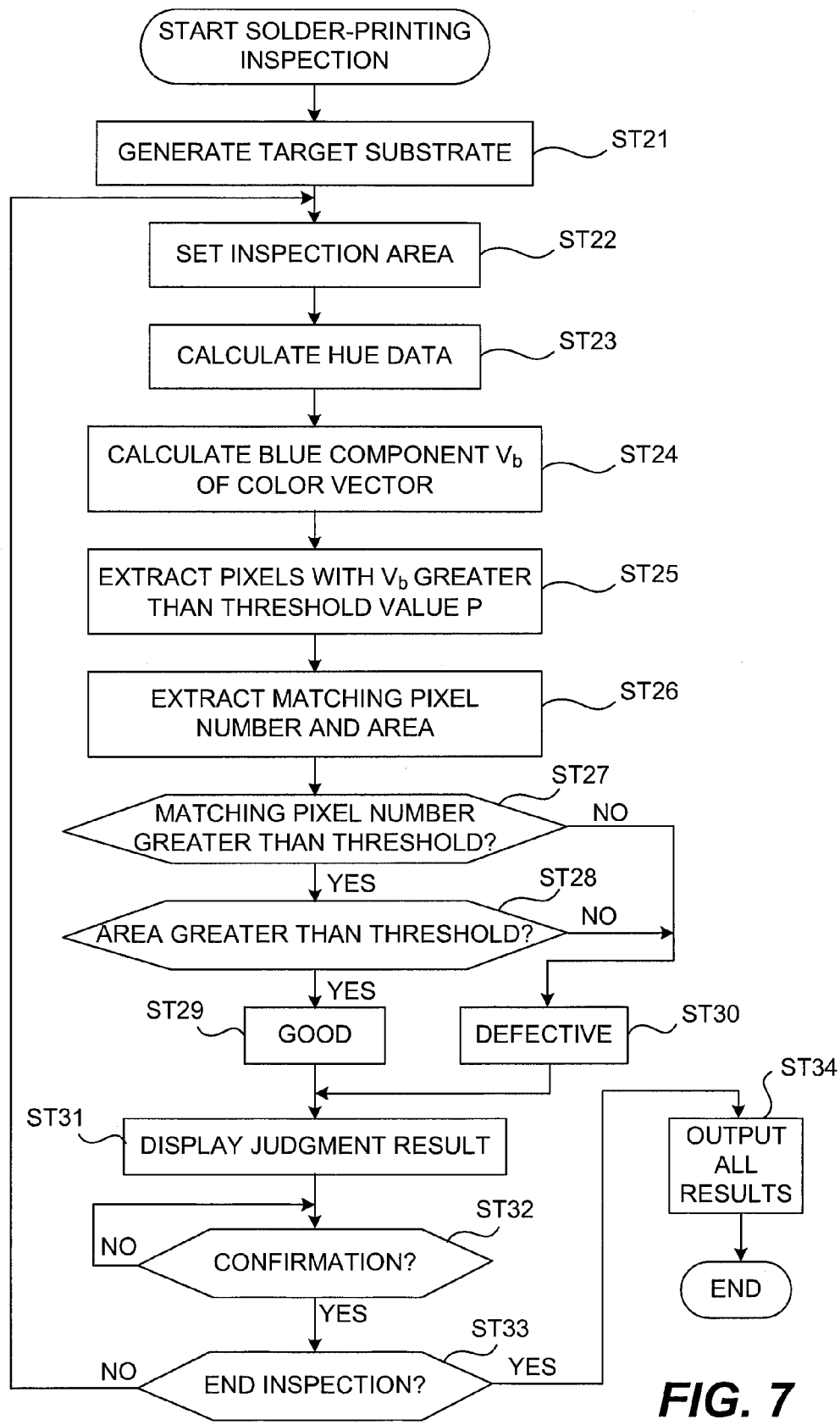
FIG. 7 is a flowchart for the inspection of a solder-coated substrate.

FIG. 7 shows the routine for the inspection of a solder-coated substrate. Prior to this routine, the control unit 11 receives the input of the name of the target substrate to be inspected, reads out the inspection data related to this substrate from the teaching table 19 and sets them in the memory 13. The routine shown by the flowchart of FIG. 7 is for carrying out on a single substrate, that is, whenever a substrate is transported to the Y-axis table part 7.

According to the routine of FIG. 7, a target image is generated as a target substrate to be inspected in transported to the Y-axis table part 7 (Step ST21). As in Steps ST1 and ST2 explained above, it is to be understood that this involves taking a plurality of images and the step of synthesizing obtained images is carried out.

After a target image is generated, the setting conditions of the inspection area corresponding to the first label are read out of the memory 13, and an inspection area is set according to the conditions that have been read out (Step ST22). Next, the hue data of each pixel in this inspection area are calculated (Step ST23), and the blue component $V_b$ of color vector is calculated by using the hue data of each pixel in the inspection area and the reference hue data (Step ST24).

Next, pixels with the value of blue component greater than the same threshold value P as used in Step ST5 in the flowchart of FIG. 4 are extracted (Step ST25). As a result of this extraction process, a binary image is generated from the image of the aforementioned inspection area, having the pixels of the aforementioned solder-printing area as black pixels and the other pixels as white pixels. This binary image corresponds to the comparison image shown in FIG. 6B.

Next, the number of the constituent pixels of the comparison image having the same value as the corresponding pixel of the model is counted (hereinafter referred to as the matching pixel number) (Step ST26). In the case of a black pixel, those of which the corresponding pixel is a black pixel are counted. In the case of a white pixel, those of which the corresponding pixel is a white pixel are counted. By counting the number of black pixels in the comparison image, the area of the aforementioned solder-printing area is calculated.

Next, the matching pixel number and the area thus calculated are each compared with a corresponding threshold value (Steps ST27 and ST28). If each of them is greater than its associated threshold value (YES in both Steps ST27 and ST28), it is judged that the solder-printing area in the inspection area is good (Step ST29). If either of them is below its corresponding threshold value, it is concluded that the solder-printing area is defective (Step ST30). This judgment method, however, is not intended to limit the scope of the invention. The judgment may be made by using only either of the matching pixel number and the area.

After a judgment is thus made on an inspection area, this judgment result is displayed by the display device 21 (Step ST31). FIG. 8 is an example of such a display that may be made. In this example, not only information concerning the target component part and the results of the inspection but also a comparison image 35 is displayed. In this example, the comparison image 35 is displayed with a contour line 36 of the land such that the relationship between the solder-printing area and the land can be clearly ascertained.

Numeral 40 indicates a confirmation button. As the user clicks on this button with the mouse, the process returns to Step ST22 through Steps ST32 and ST33 and the processes as described above are repeated for another inspection area. After similar processes from the calculation of color data to the display of judgment results are thereafter repeated for all inspection areas (YES in Step ST33), the judgment results thus far obtained are combined together to generate inspection result data on one substrate and outputted through the communication part 23 (Step ST34). Alternatively, the output of a judgment result may be carried at the end of all inspections only regarding target parts that have been considered defective.

By the automatic teaching and inspection processes described above, soldering areas can be extracted more accurately than by a prior art method using a threshold value for binarization even if their tint or hue has become somewhat different from that of a model substrate.

The example described above is not intended to limit the scope of the invention. For example, the red component $V_r$, instead of the blue component $V_b$, of the color vector V may be used for the extraction of a solder-printing area. In such a case, pixels with the red component larger than a specified threshold value in the negative direction will be extracted as constituent pixel of a solder-printing area. Constituent pixels of a solder-printing area may be extracted by using both the blue and red components.

Next, a method of fillet inspection on a substrate after a soldering process is explained. FIG. 9A shows an example of color distribution that may be obtained from a fillet on a chip component by a color highlight method. For a contrast, FIG. 9B shows a color distribution that will be obtained from a solder piece that has solidified in a semi-spherical form. FIGS. 9A and 9B are intended to show the relationship between the sloping condition of a solder portion and the observed color distribution. They are not intended to indicate that such color distributions will be actually observed when seen from sideways.

If a fillet is normally formed, the color distribution is from blue to green to red as seen from the top to the bottom of the fillet, as shown in FIG. 9A. If the slope is steep, as in the example of FIG. 9A, the blue portion becomes dominantly large. If a fillet is not normally formed and a solder piece has solidified in a semi-spherical form as shown in FIG. 9B, the distribution of color areas will be from red to green to blue as seen from its center part to a peripheral part.

Figure 10A:
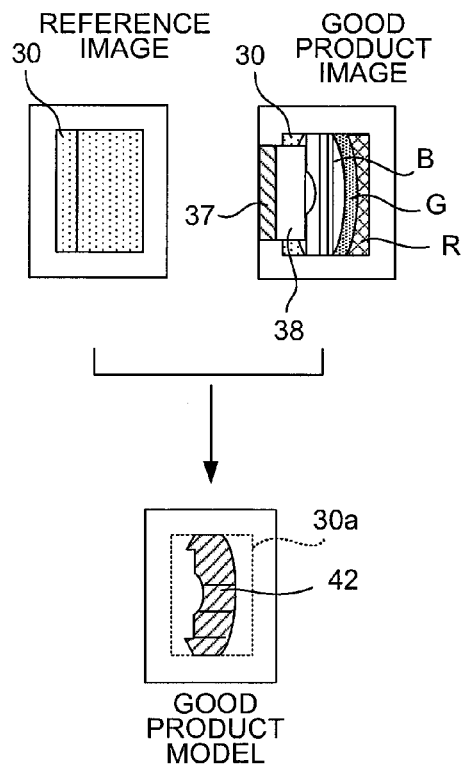
FIGS. 10A and 10B, together referred to as FIG. 10, show methods of making models for inspecting a fillet.
Figure 10B:
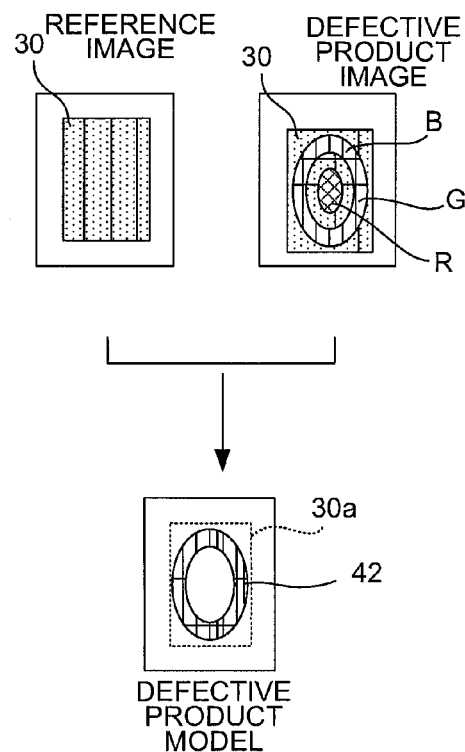
Figure 11A:
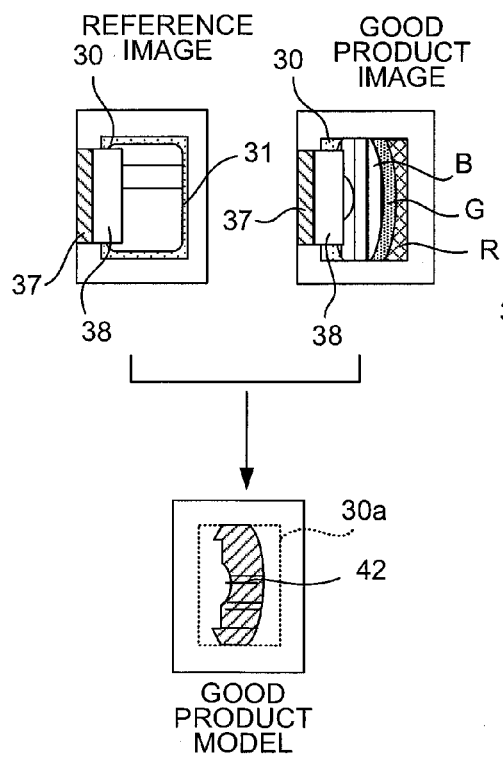
FIGS. 11A and 11B, together referred to as FIG. 11, show other methods of making models for inspecting a fillet.
Figure 11B:
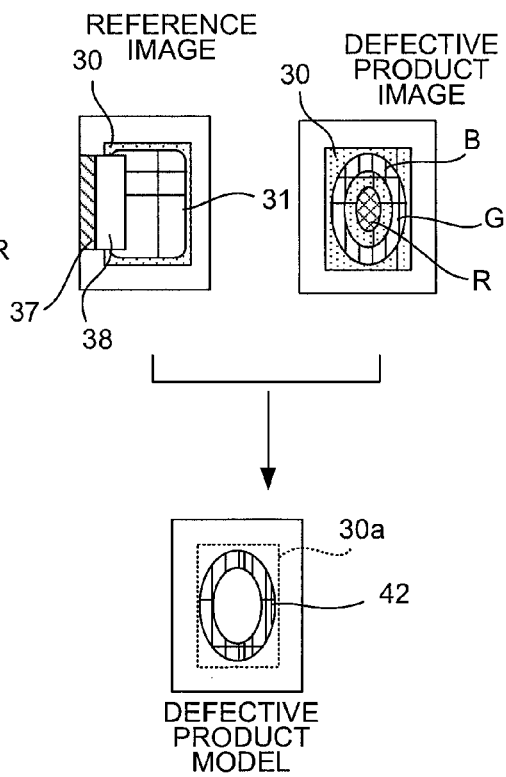

In view of the difference shown by FIGS. 9A and 9B, models for normal fillets and defective solder portions are prepared as shown in FIGS. 10 and 11 and registered in the teaching table 19. Models for a normal fillet and a defective solder portion are hereinafter respectively referred to as a good product model and a defective product model. Areas with solder which has been once molten and solidified again (inclusive of both fillets and defective solder parts) are hereafter after referred to as a resolidified solder areas.

FIGS. 10 and 11 show a reference image, a good product image and a defective product image corresponding to the resolidified solder area of FIG. 9. In these figures, the images of a land and a solder-printing area are respectively indicated by numerals 30 and 31 as in FIGS. 3A and 3B, numerals 37 and 38 respectively indicating a component main body and an electrode on the main body. The color areas in the resolidified solder area are indicated by a pattern as in FIG. 9 and also by way of symbols R, G and B.

The reference image of FIG. 10 is one taken of a bare substrate. The good product image and the defective product image are obtained from a substrate after the soldering process (hereinafter referred to as a soldered substrate). Images of fillets shown in FIG. 9A appear on the good product image, and an image of the defective solder shown in FIG. 9B appear on the defective product image.

The reference image of FIG. 11 is one taken of a substrate after the component mounting process has been completed but before being transported out for the soldering process (hereinafter referred to as component-mounted substrate). The good product image and the defective product image are both similar to the examples shown in FIG. 10.

As explained above, the image 30 of a land under color highlight illumination becomes reddish. Thus, if the image of a bare substrate is used as the reference image as in FIG. 10, the color vector V corresponding to the blue area in a resolidified solder area shows a change from a condition wherein the red hue data $R_{OP}$ are dominant into a condition wherein the blue hue data $B_{OP}$ are dominant.

The image of a solder-printing area is grey and the blue hue data $B_{OP}$ become most dominant. In the blue area of a resolidified solder area, the blue hue data $B_{OP}$ become even more dominant. Thus, as shown in FIG. 11, the blue hue data $B_{OP}$ of the color vector V undergo a large change even in the case where the image of a component-mounted substrate is used as the reference image.

Components usually have a flat surface, being glossy, such that reddish mirror-reflected light is in a condition of easily entering the camera but blue light is hardly made incidence. Thus, if the image of a bare substrate is used as the reference image, the blue component $V_b$ of the color vector V corresponding to the component main body 37 or the electrode 38 does not become too large. In the green and red portions of a resolidified solder area, the green component $V_g$ and the red component $V_r$ become large, respectively, but the blue component $V_b$ becomes very small and hardly changes with respect to the reference image. If the image of a component-mounted substrate is used as the reference image, the color vector V becomes very small because the image of the portions of the main body 37 and the electrode 38 become the same and the blue component $V_b$ does not become conspicuous. The blue component $V_b$ does not become large either for the green or red areas of a resolidified area as in the case where the image of a bare substrate is used as the reference image. Thus, even where the image of a bare substrate of a component-mounted substrate is used as the reference image, the blue area in a resolidified area can be accurately obtained by extracting an area where the blue component $V_b$ of the color vector V is large in the positive direction.

In view of the above, by the inspection method for a fillet according to this example of the invention, hue data are calculated for a good product image and a defective product image as shown above with reference to FIG. 4, the area 42 where the blue component $V_b$ of the color vector V becomes greater than a specified threshold value is extracted as the blue area of the solder and a binary image is generated by making the pixels within this area 42 as black pixels. The binary image corresponding to a good product image is registered as the good product model and the binary image correspond to a defective product image is registered as the defective product model.

Although FIGS. 10 and 11 show a contour line 30a on the good product model and the defective product model, this is merely for the purpose of making the comparison easier. There is no necessity to include such a contour line 30a on the actual model.

For the inspection of a solder-coated substrate, a whole image of the substrate is used to generate a model of the solder-printing areas and the setting conditions of inspection areas are determined. For the inspection of fillets, inspection areas may be preliminarily set and thereafter models may be generated by preparing a good product image and a defective product image for each inspection area.

Inspection areas for a fillet inspection may be set on the basis of lands as conventionally done. If a soldering inspection has already been done on the same substrate, however, the setting conditions of inspection areas for the soldering inspection may be utilized to set inspection areas only at positions where components are to be mounted.

Details of a routine for a fillet inspection on a single substrate are explained next with reference to FIG. 12. This routine, too, starts by transporting in a target substrate to be inspected and taking images of the substrate to generate target images (Step ST41). Subsequent Steps ST42-ST45 are substantially similar to Steps ST22-ST25 explained above, an inspection area being set in Step ST42, hue data being calculated in Step ST43, a color vector being calculated by using the calculated hue data and registered reference hue data in Step ST44, and pixels with the blue component $V_b$ of this color vector greater than the threshold value Q (Q>0) being extracted. As a result, a binary comparison image is generated having the blue area in the aforementioned resolidified solder area as the black pixel area.

Next, a comparison process is carried out between this comparison image and each model. This may be done by obtaining the matching pixel number (defined as the number of pixels with the same values as the corresponding pixels of a good product model as in FIG. 7) and the non-matching pixel number (defined as the number of pixels with values different from the values of corresponding pixels of a good product model) and comparing them with respective threshold values.

Thus, the matching pixel number and the non-matching pixel number are extracted with respect to a good product model (Step ST46). Next, the matching pixel number and the non-matching pixel number are respectively compared with their associated threshold values $T_{A1}$ and $T_{B1}$ (Steps ST47 and ST48). If the matching pixel number is over its threshold value $T_{A1}$ but the non-matching pixel number is less than its threshold value $T_{B1}$, a matching pixel number and a non-matching pixel number with respect to a defective product model are extracted (Step ST49). The matching pixel number and the non-matching pixel number thus extracted are further compared with specified threshold values $T_{A2}$ and $T_{B2}$ (Steps ST50 and ST51). If the matching pixel number is less than the threshold value $T_{A2}$ and the non-matching pixel number is over the threshold value $T_{B2}$, it is judged that the blue area in the inspection area is "good" (Step ST52).

If the matching pixel number is less than the threshold value $T_{A1}$ and the non-matching pixel number is over the threshold value $T_{B1}$ in the comparison process of Steps ST47 and ST48, the judgment with respect to the defective product model is not carried out and it is judged that the blue area is "not good" (Step ST53). Even if the judgment results of both Steps ST47 and ST48 are YES, the blue area is still judged to be "no good" if the matching pixel number is over the threshold value $T_{A2}$ or the non-matching pixel number is below the threshold value $T_{B2}$.

After the judgment on an inspection area is thus completed, this judgment result is displayed on the display part 21 (Step ST54). Thereafter, as explained with reference to FIG. 7, processes for the next inspection area are carried out (Steps ST55-ST56-ST42). After all inspection areas have been processed, inspection result data on the substrate as a whole is generated and outputted (Step ST57).

As explained above, if areas where the blue hue data made a large change in the positive direction are extracted, blue areas can be accurately extracted even in the presence of large fluctuations in the tint of a resolidified area, say, due to a change in the illumination condition. Thus, inspections more accurate than by a conventional binarization method with fixed gradation data r, g and b become possible according to this invention.

In the case of actual substrates, however, there are always some fluctuations in the slope angle of a fillet even in a good condition and hence the position and size of a blue area on the image cannot be strictly determined. There are also different kinds of defects including examples where no fillet is formed at all, where a fillet is formed only partially and where a fillet is formed but its angle of slope is not proper.

Figure 13:
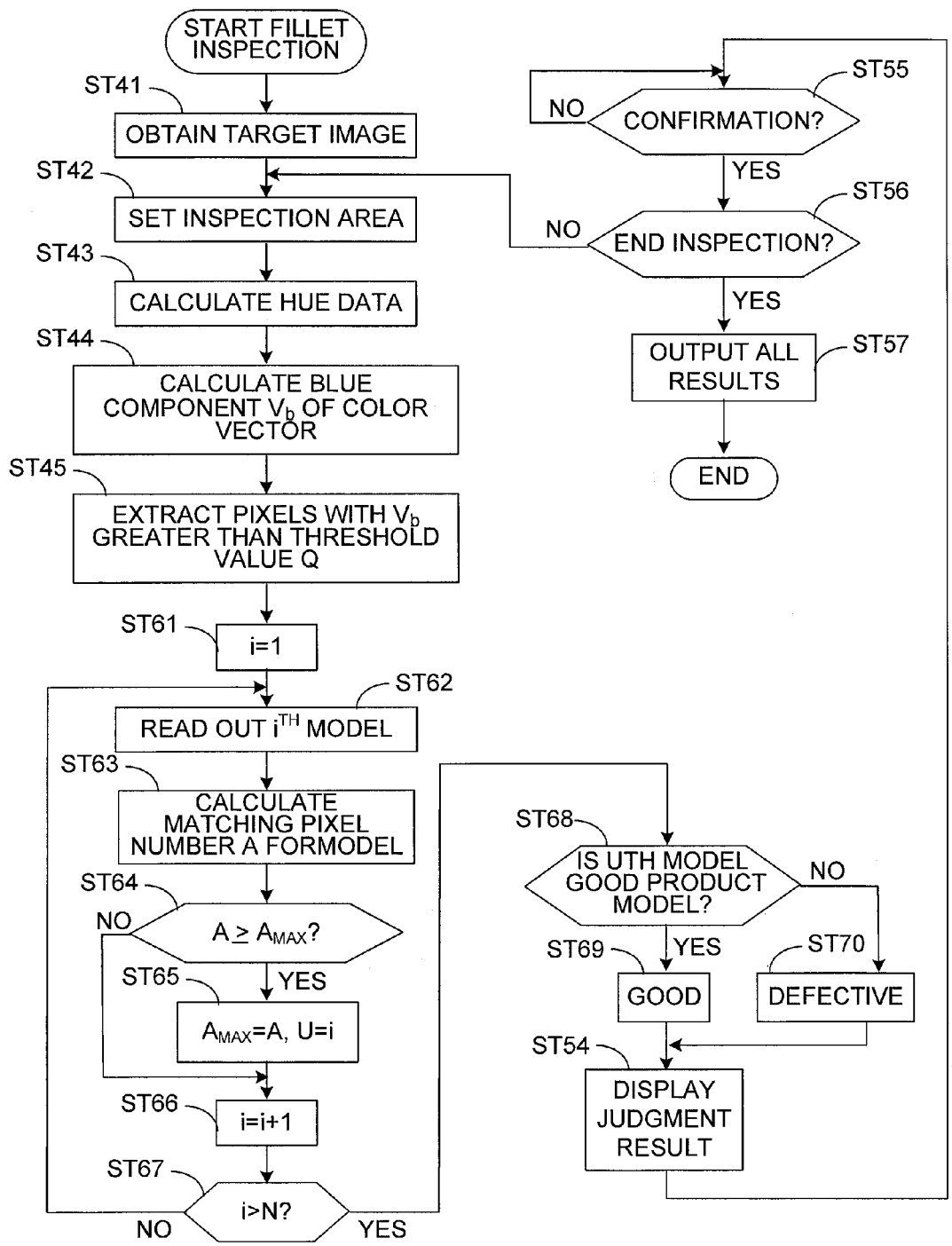
FIG. 13 is a flowchart for another routine for the inspection of a fillet.

FIG. 13 shows another method of inspecting a fillet in view of the above, characterized as providing a plurality of good product and defective product models and judging a target component part by extracting a model best suited to the given target component part. Good and defective products from which these models are created may be prepared by an expert capable of judging the quality of a fillet by visual observation.

Figure 12:
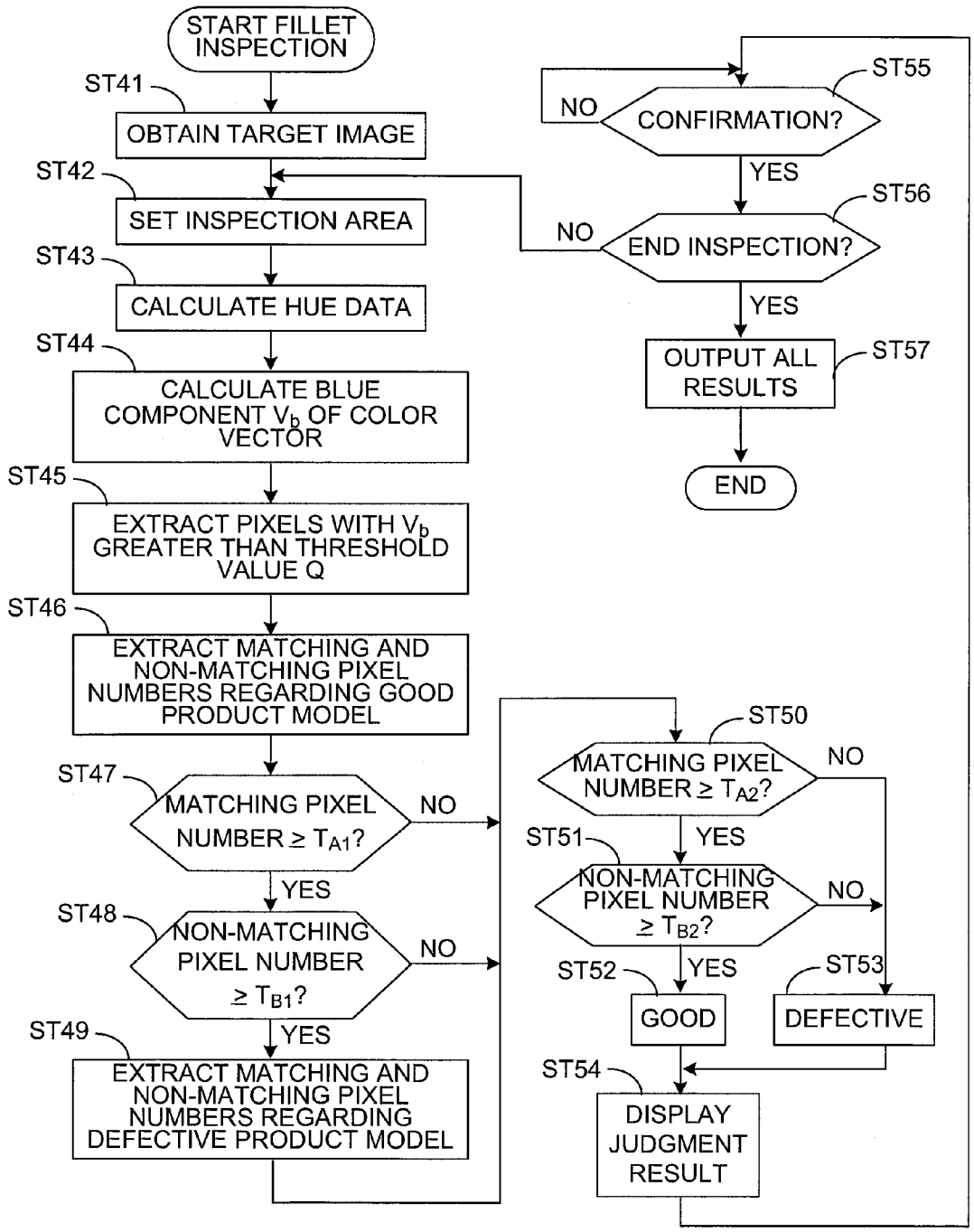
FIG. 12 is a flowchart for a routine for the inspection of a fillet.

The routine shown in FIG. 13 is the same as that shown in FIG. 12 except Steps ST46-ST53 are replaced by Steps ST61-ST70. The remaining steps in FIG. 13 are the same as those shown in FIG. 12 and hence will be indicated by the same symbols and will not be repetitively explained. In what follows, the total number of good and defective product models will be indicated by N and the ID number of each model is indicated by dummy index (or counter) i.

After a target image is generated in aforementioned Step ST41 and a comparison image is generated for a specified inspection area (Steps ST42-ST45), the dummy index i is set equal to its initial value of 1 (Step ST61) and the $i^{th}$ model (either a good product model or a defective product model) is read out of the teaching table 19 (Step ST62).

Next, the matching pixel number A between the model that has been read out and the comparison image is obtained (Step ST63). This may be obtained by scanning each pixel of the model with respect to the comparison image and as the maximum of the matching pixel numbers each obtained by one of the scans. The matching pixel number A thus obtained is compared with a maximum value $A_{max}$ (initial value being 0). If A is greater than $A_{max}$, the maximum value Amax is replaced by A and the current value of the dummy index i is stored as variable U.

Steps ST61-ST65 are thereafter repeated by each time increasing the value of the dummy index i by 1 until it reaches N (Steps ST66 and ST67). By this series of steps, the largest of the values of matching pixel number A of the models finally becomes equal to $A_{max}$ and the model ID when this maximum matching pixel number $A_{max}$ was obtained becomes equal to U.

If the model corresponding to the value of U is a good product model (YES in Step ST68), the fillet is judged to be good (Step ST69). If the model corresponding to the value of U is a defective product model (NO in Step ST68), the fillet is judged to be defective (Step ST70). Thereafter, Steps ST54-ST57 explained above with reference to FIG. 12 are carried out.

By the routine according to the flowchart of FIG. 13, the condition of a fillet can be judged according to a finer standard. The displacement, or the positional difference, between the model and the comparison image as of the time when the maximum matching pixel number $A_{max}$ is rewritten (or the number of the scan of the model with respect to the comparison image) may be stored. When the model corresponding to the variable U is judged to be a good product model, this may be used to judge whether the fillet was formed at the right position.

In the inspection of a fillet, since it is preferable to check also the red and green areas, the routine described above may be used also for the green and red components $V_g$ and $V_r$ of the color vector V to individually extract areas of these colors to make judgments.

The color vector may be used also in the inspection of components on a component-mounting substrate for accurately extracting target components to be inspected.

FIGS. 14A, 14B and 14C (together referred to as FIG. 14) show examples of models to be used for the inspection of a component. In these examples, each inspecting area is taken to correspond to that of one land but an inspection area large enough to include a component and all lands that correspond to the component may be set. For convenience of explanation, like or equivalent components are indicated by the same symbols as used in FIGS. 10 and 11.

In the examples of FIG. 14, the image of a solder-coated substrate is set as the reference image and the area 43 of each image of a good or defective product where the red component $V_r$ of the color vector V is large in the positive direction is extracted as the area corresponding to the component. This is because the red hue data $R_{OP}$ become dominant on the image of a component or an electrode and the red hue data $R_{OP}$ of the vector V corresponding to it is expected to have a large charge in the positive direction.

FIG. 14 shows one good product model (FIG. 14A) and two defective product models (FIGS. 14B and 14C). The defective product model of FIG. 14B is generated by using the image of a condition where the component is completely missing and that of FIG. 14C is generated by using the image of a condition where the component is displaced. Additional models may be set with different displacements. More than one good product model may be set, including those with displacements within an allowable limit.

These good and defective product images are obtained by taking images of components set under different conditions on a land. The work of setting these components is carried out by a skilled worker, as in the case of the inspection of a fillet.

Figure 15:
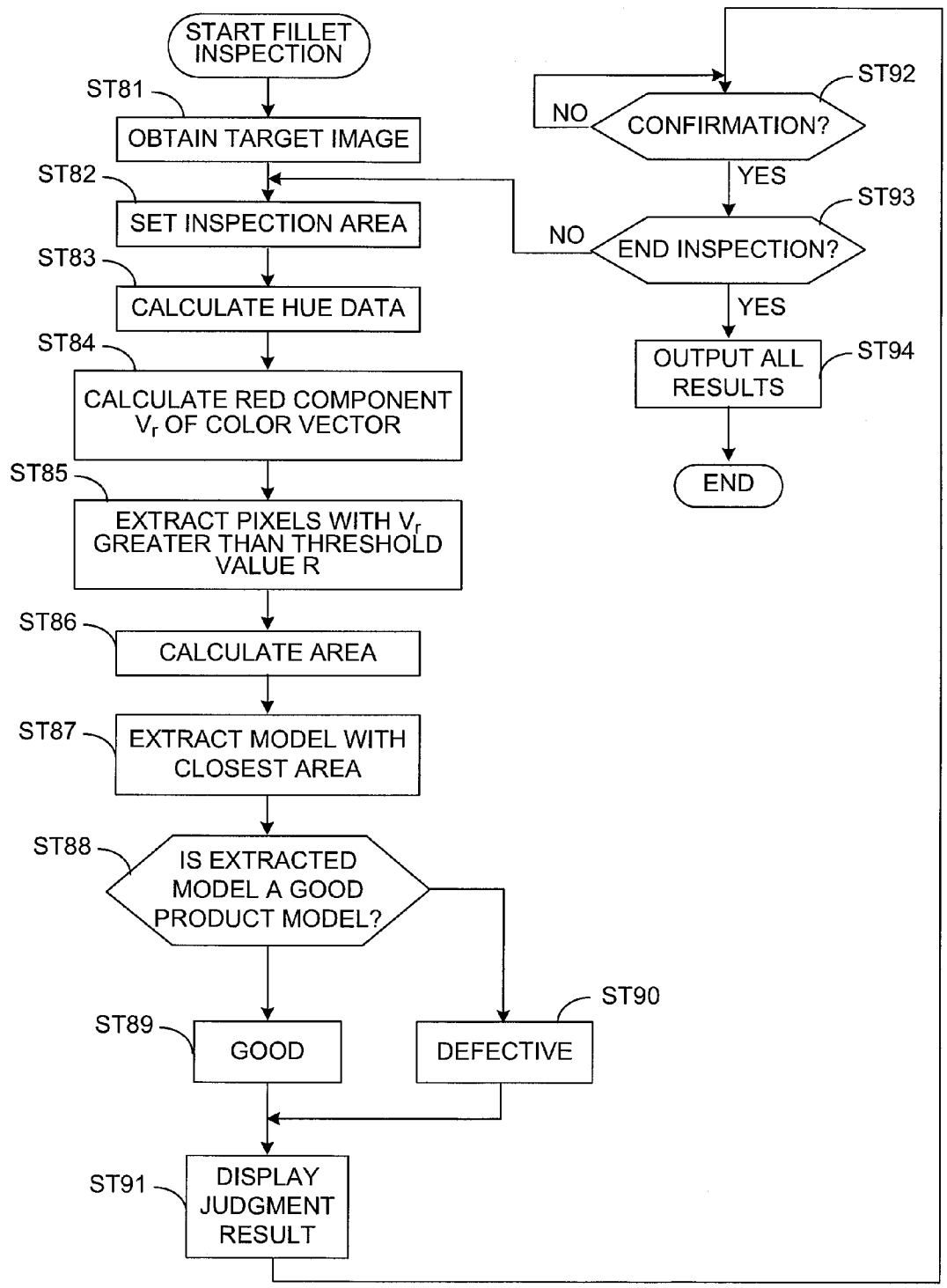
FIG. 15 is a flowchart for a routine for the inspection of a component.

FIG. 15 shows the routine for the component inspection by using such models. In this routine, too, an inspection image representing the whole of the target substrate to be processed is generated first (Step ST81). Next, an inspection area is set (Step ST82) and color data are calculated (Step ST83), also as in the case of the inspection of printed solder or a fillet.

Next, the calculated results of the hue data are used to calculate the red component $V_r$ of the color vector V (Step ST84), and the pixels where the red component $V_r$ is greater than a specified threshold value R (R>0) are extracted (Step ST85). In this extraction process, a binary image having the extracted pixels as black pixels and the other pixels as white pixels is generated like the good product and defective product models.

Next, the area of the component appearing on the image is obtained by counting the number of the black pixels in this binary image (Step ST86), and the model with the area of a component closest to the result of calculation in Step ST86 is extracted out of the N models registered in the teaching table 19 (Step ST87). If the model thus extracted is a good product model (YES in Step ST88), the mounted condition of this component is judged to be good (Step ST89). If the extracted model is a defective model (NO in Step ST88), the mounted condition of the component is judged to be defective (Step ST90).

Thereafter, after the judgment result is displayed (Step ST91) and the confirmation operation is accepted (Step ST92) as in the previous examples, the processes for the next inspection area are started. After all inspection areas are processed (YES in Step ST93), all inspection results are outputted (Step ST94) and the inspection of this one substrate is completed.

In each of the examples described above, hue data which undergo a big change as a target component part is set are considered and an area where the change by the hue data either in the positive or negative direction is greater than a specified threshold value is extracted as the target component part. By an extraction method like this, a target component part can be accurately extracted even if a shadow may be cast over a portion of the target component part or the environmental condition changes to affect the brightness of the image but a target component part can be accurately extracted based on the change of hue data and an inspection can be carried out with a high level of accuracy.

What is claimed is:

1. An image processing method of extracting a target object from a target image and carrying out a specified image processing by causing a computer of an image processor for processing color images from a color image taking device to execute a program stored on a computer-readable memory medium, said target image being a color image which is a combination of color data corresponding to a plural n-number of different hues, said method comprising:
   a first step of obtaining a reference image by an image-taking means in the absence of said target object in the field of vision of said image-taking means;
   a second step of considering those of said color data corresponding to specified less than n of said different hues and extracting difference both in magnitude and in direction in the degree of intensity of said considered color data relative to said combination of color data corresponding to n different hues between each pixel of said target image containing said target object and a corresponding pixel on said reference image; and
   a third step of extracting those of said pixels of said target image for which the difference extracted in said second step is greater than a specified threshold value and is in a specified direction and recognizing an image area formed by the extracted pixels as said target object.

2. A substrate inspection method of obtaining a target image by causing a computer of an image processor for processing color images from a color image taking device to execute a program stored on a computer-readable memory medium and taking an image of a target substrate to be inspected, said target image being a color image which is a combination of color data corresponding to a plural n-number of different hues, extracting target component parts from the obtained target image and carrying out a specified inspection, said method comprising:
   a first step of obtaining a reference image from a substrate without having said target component parts thereon;
   a second step of thereafter setting a target area to be inspected at a position corresponding to one of said target component parts on said target image;
   a third step of considering those of said color data corresponding to specified less than n of said different hues and extracting difference both in magnitude and in direction in the degree of intensity of said considered color data relative to said combination of color data corresponding to n different hues between each pixel contained in said target area and a corresponding pixel on said reference image; and a fourth step of extracting those of said pixels of said target image for which the difference extracted in said third step is greater than a specified threshold value and is in a specified direction and carrying out image processing for said specified inspection on an image area comprised of the extracted pixels;

each of said first step, said second step, said third step and said fourth step being carried out for each of said target component parts.

3. A substrate inspection apparatus comprising:

an image generating part for generating a color image of a target substrate for inspection, said color image being a combination of color data corresponding to a plural n-number of different hues;

an image processor for extracting a target component part for inspection from said color image of said target substrate generated by said image generating part and carrying out an image processing for inspection;

a judging part for judging whether said target substrate is good or defective based on results of said image processing by said image processor; and an output part for outputting results of judging by said judging part;

wherein said image processor has the functions of:

color data processing by considering those of said color data corresponding to specified less than n of said different hues and calculating the degree of intensity of said considered color data relative to said combination of color data corresponding to n different hues for each pixel;

registering in a memory a reference image obtained by said image generating part from a substrate not provided with any target component part or results of said color data processing function on said reference image;

setting a target area to be inspected, when a target image of said target substrate for inspection is generated by said image generating part, at a position corresponding to a target component part in said target image;

first extraction for having an image in said set target area processed by said color data processing function and using results of the process by said color data processing function and data stored by said memory to extract difference both in magnitude and in direction in the degree of intensity of said considered color data relative to said combination of color data corresponding to n different hues between each pixel in said target area and a corresponding pixel on said reference image;

second extraction for extracting those of the pixels of said target image at which the change extracted by said first extraction function is greater than a specified threshold value and is in a specified direction; and recognizing an image area formed by the pixels extracted by said second extraction function as said target component part.

4. A method of generating inspection data for an automatic inspection of a substrate by causing a computer of an image processor for processing color images from a color image taking device to execute a program stored on a computer-readable memory medium and using a color image which is a combination of color data corresponding to a plural n-number of different hues; said method comprising:

a first step of obtaining a reference image from a substrate without target component part thereon;

a second step of obtaining a target image for inspection from a substrate having a target component part thereon;

a third step of considering those of said color data corresponding to specified less than n of said different hues and extracting difference both in magnitude and in direction in the degree of intensity of said considered color data relative to said combination of color data corresponding to n different hues between each pixel of said target image and a corresponding pixel on said reference image;

a fourth step of extracting those of said pixels of said target image for which the difference extracted in said third step is greater than a specified threshold value and is in a specified direction and recognizing an image area formed by the extracted pixels as said target component part; and a fifth step of setting a target area for inspection including said target component part recognized in said fourth step and including said set target area in said inspection data for said target component part.

* * * * *